(12) United States Patent
Amdahl et al.

(10) Patent No.: US 7,133,278 B2
(45) Date of Patent: Nov. 7, 2006

(54) POWER LINE NETWORKING ADAPTER

(75) Inventors: Paul O. Amdahl, Sioux City, IA (US); Frank Liebenow, Jefferson, SD (US); Keith Thomas, Vermillion, SD (US); Michael E. Tubbs, Elk Point, SD (US)

(73) Assignee: Gateway Inc., Irvine, CA (US)

( * ) Notice: Subject to any disclaimer, the term of this patent is extended or adjusted under 35 U.S.C. 154(b) by 323 days.

(21) Appl. No.: 10/766,175

(22) Filed: Jan. 28, 2004

(65) Prior Publication Data
US 2004/0186908 A1 Sep. 23, 2004

Related U.S. Application Data

(60) Provisional application No. 60/443,078, filed on Jan. 28, 2003.

(51) Int. Cl.
- H05K 5/00 (2006.01)
- H02M 1/00 (2006.01)
- G06F 15/16 (2006.01)

(52) U.S. Cl. ...................... 361/679; 363/144

(58) Field of Classification Search .............. 363/144, 363/146; 361/679, 683, 686, 728, 752; 709/227, 709/238
See application file for complete search history.

(56) References Cited

U.S. PATENT DOCUMENTS

| | | | |
|---|---|---|---|
| 4,468,600 A | 8/1984 | Barthel et al. | |
| 4,521,722 A | 6/1985 | Barthel et al. | |
| 4,864,156 A * | 9/1989 | Tigges et al. | 307/117 |
| 5,151,838 A | 9/1992 | Dockery | |
| 5,220,420 A | 6/1993 | Hoarty et al. | |
| 5,319,455 A | 6/1994 | Hoarty et al. | |
| 5,327,230 A | 7/1994 | Dockery | |
| 5,361,091 A | 11/1994 | Hoarty et al. | |
| 5,466,165 A | 11/1995 | Boesel et al. | |
| D367,257 S | 2/1996 | Buelow et al. | |
| 5,510,691 A | 4/1996 | Palatov | |
| 5,510,975 A | 4/1996 | Ziegler, Jr. | |
| 5,818,705 A | 10/1998 | Faulk | |
| 6,045,274 A | 4/2000 | Nakanishi | |
| 6,304,428 B1 * | 10/2001 | Sato | 361/600 |
| 6,307,764 B1 | 10/2001 | Peek et al. | |
| 6,331,814 B1 * | 12/2001 | Albano et al. | 375/258 |
| 6,373,377 B1 | 4/2002 | Sacca et al. | |
| 6,526,581 B1 | 2/2003 | Edson | |
| 6,564,051 B1 | 5/2003 | Struhsaker et al. | |
| 6,664,760 B1 | 12/2003 | Kobayashi | |
| 6,665,720 B1 | 12/2003 | Willis et al. | |
| 6,768,633 B1 * | 7/2004 | Chuang | 361/679 |

OTHER PUBLICATIONS www.gigafast.com/products/HomePlug/PE909-UI/PE909-UI.htm—14Mbps HomePlug USB Adapter—HomePlug Powerline Alliance, Mar. 2003.

(Continued)

*Primary Examiner*—Matthew V. Nguyen
(74) *Attorney, Agent, or Firm*—Adam Cermak; Jeffrey A. Proehl

(57) ABSTRACT

A powerline networking adapter attaches to a power brick and includes a network data connection and two AC power connections. In another embodiment, a hybrid power brick includes both AC-DC power conversion elements and powerline networking adapter circuits in the brick.

11 Claims, 3 Drawing Sheets

OTHER PUBLICATIONS

APC Legendary Reliability—www.apc.com/resource/include/techspec_index.cfm?base_sku=PNOTE1&language...*SurgoArrest Notebook w/tel Wallmount 120V Dec. 2003.

APC Legendary Reliability—www.apc.com/resource/include/techspec_index.cfm?base_sku=PNOTE1&language...— SurgeArrest Notebook Feb. 2003.

APC Legendary Reliability—www.apc.com/resource/include/techspec_index.cfm?base_sku=PNOTE1&language...—SurgeArrest Notebook Pro C8 w/tel inlilne design 100-240V, Feb. 2003.

APC Legendary Reliability—www.apc.com/resource/include/techspec_index.cfm?base_sku=PNOTE1&language...—SurgeArrest Notebook Pro C6 inline design 100-240V, Feb. 2003.

* cited by examiner

POWER LINE NETWORKING ADAPTER

This application is related and claims priority to U.S. provisional application No. 60/443,078, filed Jan. 28, 2003, entitled "APPARATUS AND METHODS OF NETWORKING DEVICES, SYSTEMS AND COMPUTERS VIA POWER LINES", the entirety of which is incorporated by reference herein, including all of the documents referenced therein.

BACKGROUND OF THE INVENTION

1. Field of the Invention

The present invention relates to devices, systems, and processes useful as Power Line Network Adapters (PLNA), and more specifically to PLNAs used in conjunction with power bricks.

2. Brief Description of the Related Art

Power Line Network Adapters (PLNA) is a recent advance in networking technology that uses a building's AC power wiring and circuits to also transmit data signals between computing devices. Typical PLNA networking is done with a module plugged into a wall electrical outlet and then connecting a USB cable (or other type of interface connection, e.g. Ethernet) to the computer. While this type of solution has had some uses, it is not a well integrated solution for systems shipped with networking and requires several user steps in installing.

Some other types of electrical adapters have previously been proposed. For example, U.S. Pat. No. 6,373,377 B1 describes a power supply in a personal computer that incorporates a network interface card (NIC). U.S. Pat. No. 6,307,764 B1 describes a power brick having signal transformers that are physically remote from a network adapter. U.S. Pat. No. 5,510,691 and U.S. Pat. No. 5,466,165 describe AC adapters with power conditioning; APC Corp., of West Kingston, R.I., offers similar devices on the current market. U.S. Pat. No. 5,818,705 describes a portable PC with an AC adapter having EMI filtering. While each of these documents proposes solutions to some problems, they do not adequately address the problems encountered by notebook, laptop, or portable personal computer users in trying to use PLNA technologies.

SUMMARY OF THE INVENTION

According to a first aspect of the invention, a self-contained power supply including powerline networking device comprises an enclosure, an AC to DC converter mounted within said enclosure including portions configured and arranged to be connected to an AC power source, a DC output from said AC to DC converter configured and arranged to power a DC-powered device, a powerline networking adapter within said enclosure and configured and arranged to be electrically connected to said AC power source, and at least one data connection on the enclosure in data communication with the powerline networking adapter for transferring network data.

According to another aspect of the present invention, a powerline networking adapter is suitable for connection to a power brick, the power brick including a brick enclosure having a first end, an AC to DC converter mounted within the brick enclosure including first portions configured and arranged to be connected to an AC power source at the brick enclosure first end, and a DC output from the AC to DC converter configured and arranged to power a DC-powered device, the adapter comprises an enclosure including an electrical power conductor having second portions configured and arranged to mate with said first portions, and a powerline networking adapter within the enclosure, said enclosure configured and arranged to mate with said brick enclosure.

According to yet another aspect of the present invention, a power supply including powerline networking comprises a first enclosure having a first end. an AC to DC converter mounted within said first enclosure including first portions configured and arranged to be connected to an AC power source at said first enclosure first end, a DC output from said AC to DC converter configured and arranged to power a DC-powered device, a second enclosure including an electrical conductor having second portions configured and arranged to mate with said first portions, and a powerline networking adapter within the second enclosure, said second enclosure configured and arranged to mate with said first enclosure.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which.

DESCRIPTION OF THE PREFERRED EMBODIMENTS

Figure 1:
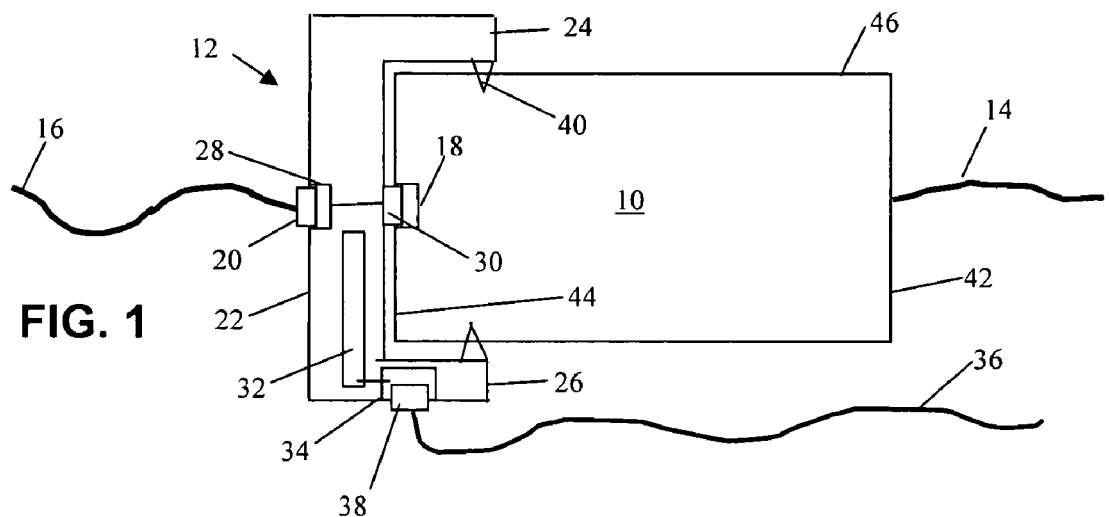
FIG. 1 schematically illustrates a first exemplary embodiment of a powerline adapter in accordance with the present invention.

Referring to the drawing figures, like reference numerals designate identical or corresponding elements throughout the several figures.

In general terms, the present invention utilizes a single AC connection to provide both DC power and networking connectivity to a portable device while requiring only a single AC socket. A PLNA device according to the present invention integrates components, such as a transformer, caps, AD and DA converters, and an interface chip to convert the signaling to some other interface, such as USB, Ethernet, Firewire, etc., into the AC power brick of a portable computer system. Preferably, although not necessarily, the interface chip complies with HomePlug specifications. Thus, a second output cable from the power brick of the portable computer system is provided for network connectivity.

In the descriptions herein, a familiarity with power bricks, being within the knowledge of the skilled artisan, is presumed, as is a familiarity with the build and operation of PLNA circuitry, and in particular the HomePlug specifications (see homeplug.org, and "HomePlug Standard Brings Networking to the Home" by Steve Gardner, Brian Markwalter, and Larry Yonge, incorporated by reference in its entirety herein.). Additionally, the aforementioned provisional patent application describes PLNA technologies useful in the present invention.

Turning now to FIG. 1, a first exemplary embodiment of a powerline adapter in accordance with the present invention is schematically illustrated. A power brick 10, known to those of ordinary skill in the art, includes a DC power cord 14 leading from the brick to, e.g., a portable computing device that operates on DC power. The power brick 10 includes an enclosure 46 including a recessed (typically male) power port 18. An AC power cord 16 includes a (typically female) connector 20 which is sized and configured to be received in the port 18, to establish an electric power connection between the cord 16 and the brick 10.

A power line adapter 12 is illustrated mounted on at least one end of the power brick 10, and more particularly the end 44 in which the recessed port 18 is positioned. While the adapter 12 is illustrated as only partially extending along the brick 10, other aspects of the present invention include that the adapter 12 is cup-shaped and envelopes the entire brick, that is, the brick is inserted fully into the adapter 12.

The adapter 12 includes a body 22 and may have at least two extensions 24, 26, which extend away from the body 22 and away from a recessed power port 28. The adapter also includes a protruding power connector 30 on the side of the adapter opposite the port 28; the connector 30 and the port 28 are in electrical communication so that AC power can readily flow between them. The port 28 is sized and configured to receive the connector 20, and the connector 30 is sized and configured to be received in port 18. While the connectors 20 and 30 can be of substantially identical size and configuration, and the ports 18 and 28 can be of substantially identical size and configuration, they can be different sizes and configurations, as long as they mate as described above. One consequence of the similarity in the connectors and ports is that the connector 20 would fit in the port 18.

The adapter 12 includes within it Power Line Network Adapter (PLNA) components, illustrated as a module 32, including, but not limited to, a transformer, caps, AD and DA converters, and an interface chip to convert the data signals that are carried by the AC current passing between line 16 and block 10 to another signaling form, such as USB, Ethernet, IEEE-1394, and the like. The PLNA module 32 is in signal communication with at least one data port 34 formed in an external surface of the adapter 12. Alternatively, the PLNA module may be in signal communication with a cable, said cable may have a connector at the far end so that it can be plugged into a port on the portable device. An example of this might be having a USB cable carrying the signal emanating from the PLNA module with a USB connector at the far end for plugging into an available USB port on the device being powered. The type of signal communication between the PLNA module 32 and the data port 34, and therefore the configuration of data port 34, can be any of numerous known networking standards, including, but not limited to, USB, Ethernet (RJ-45), IEEE-1394 (Firewire), and the like. Additionally, there can be a plurality of ports 34, of the same or different data signal types; for different network types, PLNA module 34 includes the necessary circuitry to communicate using the different protocols.

A data line 36 includes a data connector 38 sized and configured to mate with port 34 and establish a data communication pathway between the PLNA module 32 and the data line 36. Another aspect of the present invention includes that the data line 36 is a captive data line, for which port 34 and connector 38 are eliminated and the data line 36 is hardwired to the PLNA module 32.

The extensions 24, 26 are illustrated in FIG. 1 as extending partially along the length of the power brick 10. In order to facilitate retention of the adapter 12 on the brick 10, structures are provided to hold the adapter on the brick. One aspect of the present invention is the additional inclusion of detents 40 extending laterally inwardly from the extensions 24, 26, which impinge on or grab a hold of the brick 10, thus holding the adapted on the exterior surface of the brick. Recesses (not illustrated) in the external surface of the brick 10 can be further provided and sized, configured, and positioned to accept the detents 40 therein. Yet another aspect of the present invention includes that the extensions 24, 26, are sized to extend the entire length of the brick 10, so that detents 40 or the like reach the end 42 of the brick. When the extensions 24, 26 are sized to extend the full length of the brick 10, the detents 40 can take the form of snaps or fingers which engage the surface of end 42. Yet another aspect of the present invention includes that the extensions 24, 26 are integrated together as a skirt (not illustrated) that fully envelopes all four lateral sides of the brick 10, and extends fully the length of the brick. Yet another aspect of the present invention includes that the lateral distance between the extensions, as discreet elements or as a continuous skirt, is selected so that the adapter 12 snugly fits around at least portions of the brick 10, and the adapter and brick are held together by friction between them and/or the force generated by slight deformation of the extensions, brick, or both. This effect can optionally be assisted by including a high-friction surface on the inside of the extensions, and/or the outside of the brick. Another aspect of the present invention would not have protrusions 24 and 26 and adapter 12 would be held in place by the friction of connector 30 within port 18.

The exemplary embodiment illustrated in FIG. 1 has numerous advantages over prior PLNA devices. First, once snapped together, the network adapter and power brick become one unit which is easier to transport. Second, a stand-alone wall-wart or brick will require a second AC outlet or must provide an AC-pass-thru. Third, the length of the data cable from the network adapter can be shortened to approximately the length of the captive DC cable, which reduces clutter and the user carries less cable when traveling.

Figure 2:
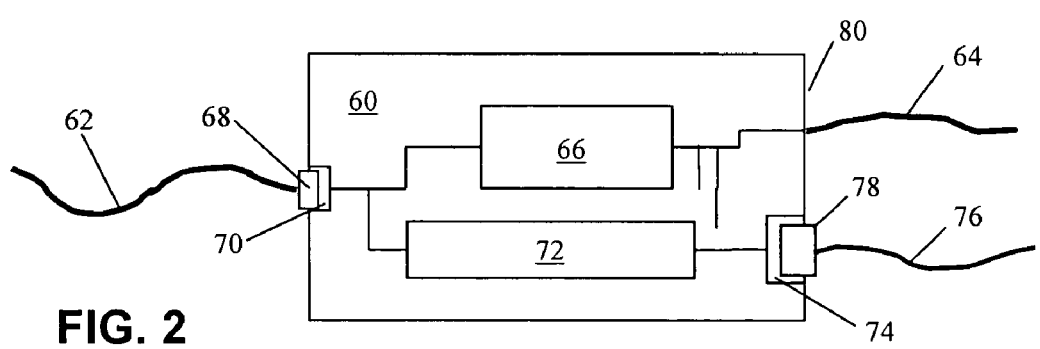
FIG. 2 schematically illustrates a second exemplary embodiment of a powerline adapter in accordance with the present invention.

Turning to FIG. 2, a second exemplary embodiment of a powerline adapter in accordance with the present invention is schematically illustrated. The embodiment illustrated in FIG. 2 is similar in some respects to the embodiment illustrated in FIG. 1 and described above. A hybrid power brick and power line network adapter 60 includes within an enclosure 80 both the AC/DC converters and transformers 66 to function as a power brick, but also the PLNA module 72 to function as a network adapter. The hybrid adapter 60 includes a captive DC power line 64 and a (typically recessed) power port 70 which is sized and configured to mate with an electrical connector 68 attached to an AC power line 62. The hybrid adapter 60 also includes a data port 74 in signal communication with the module 72, and which is sized and configured to receive a mating data connector 78 on a network data line 76. The module 72 is similar to module 32 described above, and there can be more than one data port 74. The type of signal communication between the PLNA module 72 and the data port 74, and therefore the configuration of data port 74, can be any of numerous known networking standards, including, but not limited to, USB, Ethernet (RJ-45), IEEE-1394 (Firewire), and the like. Additionally, there can be a plurality of ports 74, of the same or different data signal types; for different network types, PLNA module 74 includes the necessary circuitry to communicate using the different protocols. Furthermore, data line 76 may be a captured cable, eliminating the need for port 74 and data connector 78.

Figure 3:
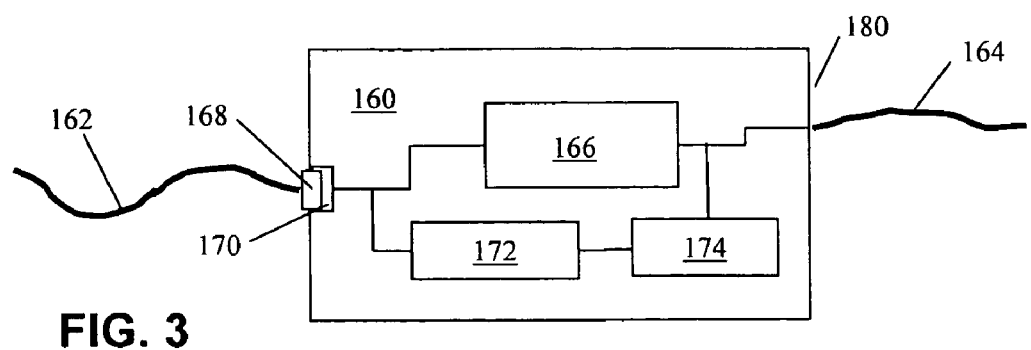
FIG. 3 schematically illustrates a third exemplary embodiment of a powerline adapter in accordance with the present invention.

Turning to FIG. 3, another exemplary embodiment of a powerline adapter in accordance with the present invention is schematically illustrated. The embodiment illustrated in FIG. 3 is similar in some respects to the embodiment illustrated in FIG. 2 and described above. A hybrid power brick and power line network adapter 160 includes within an enclosure 180 both the AC/DC converters and transformers 166 to function as a power brick, but also the PLNA module 172 to function as a network adapter. The hybrid adapter 160 includes a captive DC power line 164 and a (typically recessed) power port 170 which is sized and configured to mate with an electrical connector 168 attached to an AC power line 162. In this embodiment, the communications signal is transmitted to the device being powered by modulating the signal over the DC power connection 164. Modulator/Demodulator 174 sends and receives unmodulated data from PLNA module 172 and modulates/demodulates the data using the DC power cable 164 to pass the modulated signal to the device being powered. Within the device being powered (not shown), would be a similar modulator/demodulator for extracting the data signal from the DC power line. Sending data signals over DC power is known in the industry and has been used in many applications, including remote sensors that receive both power and transceive data over two wires. These data signals are usually coupled with the DC power using coupling capacitors and filtered from the DC power using high-pass or low-pass filters, or the like. The type of signal communication between the PLNA module 172 and the modulator/demodulator 174 can be any serial or parallel data transfer. In some embodiments PLNA module 172 and modulator/demodulator 174 can be integrated into a single module or even integrated into the same integrated circuit.

Figure 4:
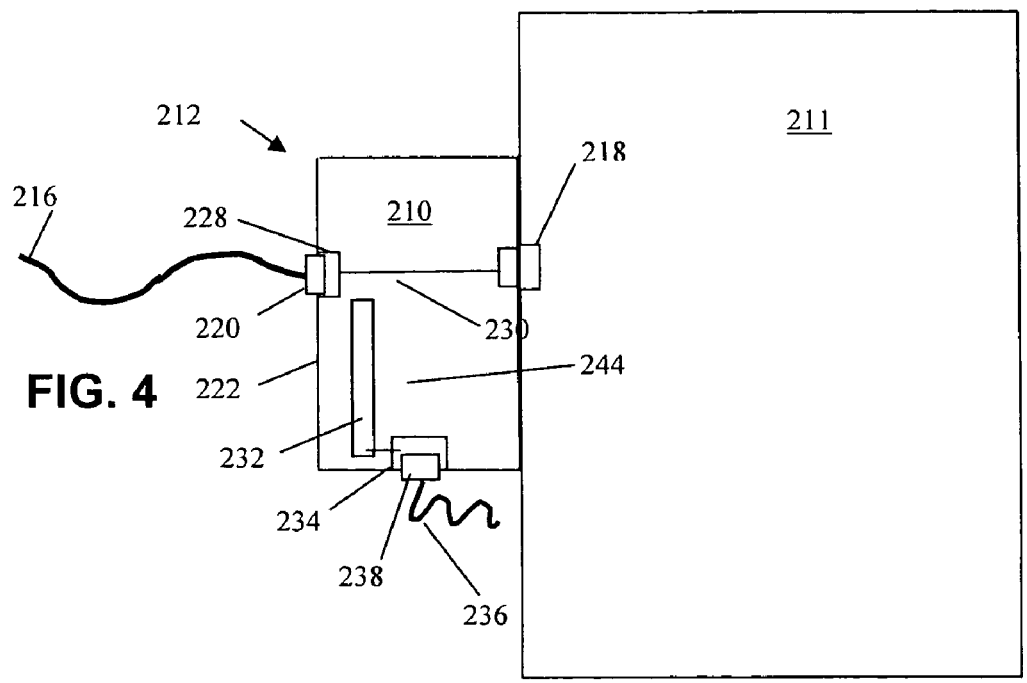
FIG. 4 schematically illustrates a third exemplary embodiment of a powerline adapter in accordance with the present invention.

Turning now to FIG. 4, another exemplary embodiment of a powerline adapter in accordance with the present invention is schematically illustrated. A network brick 210 includes a connector 219 leading from the brick to, e.g., a computing device that operates on AC power. The network brick 210 includes an enclosure 222 including a recessed (typically male) power port 228. An AC power cord 216 includes a (typically female) connector 220 which is sized and configured to be received in the port 228, to establish an electric power connection between the cord 216 and the brick 210. AC power is passed from power port 228 to connector 219 for the purpose of providing power to the powered device.

A power line networking adapter 210 is illustrated connected to a device that operates on AC power 211. The adapter includes a protruding power connector 219 on the side of the adapter, possibly opposite the port 228; the connector 219 and the port 228 are in electrical communication so that AC power can readily flow between them. The port 228 is sized and configured to receive the connector 220, and the connector 219 is sized and configured to be received in port 218 of powered device 211. While the connectors 220 and 219 can be of substantially identical size and configuration, and the ports 218 and 228 can be of substantially identical size and configuration, they can be different sizes and configurations, as long as they mate as described above. One consequence of the similarity in the connectors and ports is that the connector 220 would fit in the port 218.

The adapter 212 includes within it Power Line Network Adapter (PLNA) components, illustrated as a module 232, including, but not limited to, a transformer, caps, AD and DA converters, and an interface chip to convert the data signals that are carried by the AC current passing between line 216 and block 210 to another signaling form, such as USB, Ethernet, IEEE-1394, and the like. The PLNA module 232 is in signal communication with at least one data port 234 formed in an external surface of the adapter 212. Alternatively, the PLNA module may be in signal communication with a cable, said cable may have a connector at the far end so that it can be plugged into a port on the portable device. An example of this might be having a USB cable carrying the signal emanating from the PLNA module with a USB connector at the far end for plugging into an available USB port on the device being powered. The type of signal communication between the PLNA module 232 and the data port 234, and therefore the configuration of data port 234, can be any of numerous known networking standards, including, but not limited to, USB, Ethernet (RJ-45), IEEE-1394 (Firewire), and the like. Additionally, there can be a plurality of ports 234, of the same or different data signal types; for different network types, PLNA module 234 includes the necessary circuitry to communicate using the different protocols.

A data line 236 includes a data connector 238 sized and configured to mate with port 234 and establish a data communication pathway between the PLNA module 232 and the data line 236. Another aspect of the present invention includes that the data line 236 is a captive data line, for which port 234 and connector 238 are eliminated and the data line 236 is hardwired to the PLNA module 232.

Figure 5:
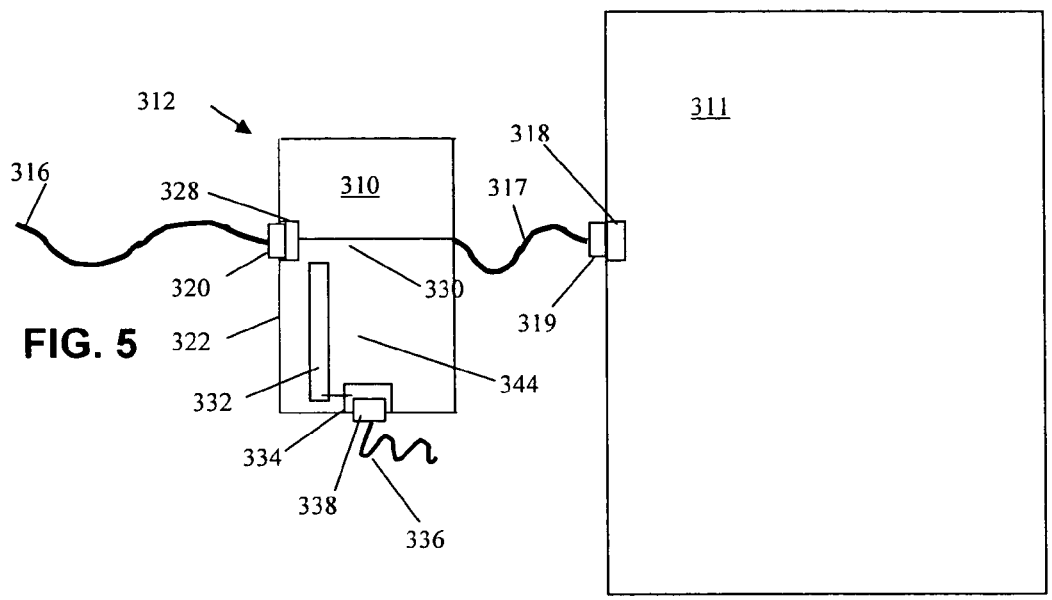
FIG. 5 schematically illustrates a third exemplary embodiment of a powerline adapter in accordance with the present invention.

Turning now to FIG. 5, another exemplary embodiment of a powerline adapter in accordance with the present invention is schematically illustrated. A network brick 310 includes a connector 319 connected to a power cable 317 leading from the brick such that it can be plugged into a computing device that operates on AC power 311. The network brick 310 includes an enclosure 322 including a recessed (typically male) power port 328. An AC power cord 316 includes a (typically female) connector 320 which is sized and configured to be received in the port 328, to establish an electric power connection between the cord 316 and the brick 310. AC power is passed from power port 328 to connector 319 for the purpose of providing power to the powered device.

A power line networking adapter 310 is illustrated connected to a device that operates on AC power 311. The adapter includes a captured AC power cable 317 with a power connector 319 on the distal end; the connector 319 and the port 328 are in electrical communication so that AC power can readily flow between them. The port 328 is sized and configured to receive the connector 320, and the connector 319 is sized and configured to be received in port 318 of powered device 311. While the connectors 320 and 319 can be of substantially identical size and configuration, and the ports 318 and 328 can be of substantially identical size and configuration, they can be different sizes and configurations, as long as they mate as described above. One consequence of the similarity in the connectors and ports is that the connector 320 would fit in the port 318.

The adapter 312 includes within it Power Line Network Adapter (PLNA) components, illustrated as a module 332, including, but not limited to, a transformer, caps, AD and DA converters, and an interface chip to convert the data signals that are carried by the AC current passing between line 316 and block 310 to another signaling form, such as USB, Ethernet, IEEE-1394, and the like. The PLNA module 332 is in signal communication with at least one data port 334 formed in an external surface of the adapter 312. Alternatively, the PLNA module may be in signal communication with a cable, said cable may have a connector at the far end so that it can be plugged into a port on the portable device. An example of this might be having a USB cable carrying the signal emanating from the PLNA module with a USB connector at the far end for plugging into an available USB port on the device being powered. The type of signal communication between the PLNA module 332 and the data port 334, and therefore the configuration of data port 334, can be any of numerous known networking standards, including, but not limited to, USB, Ethernet (RJ-45), IEEE-1394 (Firewire), and the like. Additionally, there can be a plurality of ports 334, of the same or different data signal types; for different network types, PLNA module 334 includes the necessary circuitry to communicate using the different protocols.

A data line 336 includes a data connector 338 sized and configured to mate with port 334 and establish a data communication pathway between the PLNA module 332 and the data line 336. Another aspect of the present invention includes that the data line 336 is a captive data line, for which port 334 and connector 338 are eliminated and the data line 336 is hardwired to the PLNA module 332.

Although the embodiment shown if FIG. 5 has been drawn with a rectangular case 322, it is also possible to make this case in any shape and form. For example, the entire network brick may be enclosed in a small case or encapsulated to appear as a bulge in a power cable or, when component sizes are reduced, all components may be housed within a plug such as 319.

Figure 6:
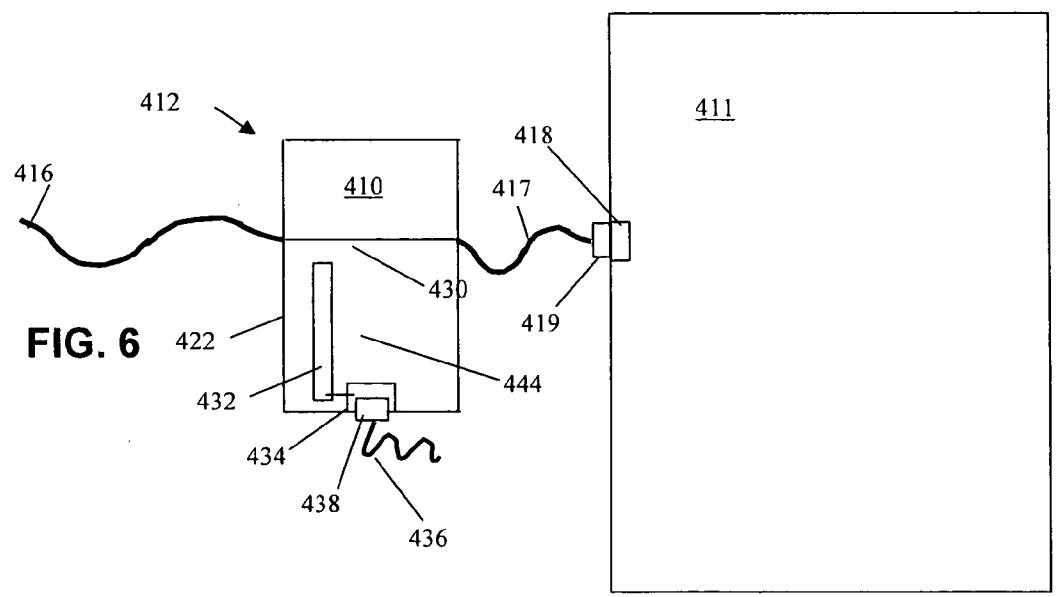
FIG. 6 schematically illustrates a third exemplary embodiment of a powerline adapter in accordance with the present invention.

Turning now to FIG. 6, another exemplary embodiment of a powerline adapter in accordance with the present invention is schematically illustrated. A network brick 410 includes a connector 419 connected to a power cable 417 leading from the brick such that it can be plugged into a computing device that operates on AC power 411. The network brick 410 includes an enclosure 422. An AC power cord 416 interfaces through enclosure 422 and usually requires an interface to assure the power cord is not easily pulled out of enclosure 422. AC power is passed from power cord 416 to connector 419 for the purpose of providing power to the powered device.

A power line networking adapter 410 is illustrated connected to a device that operates on AC power 411. The adapter includes a captured AC power cable 417 with a power connector 419 on the distal end; the connector 419 and the power cord 416 are in electrical communication so that AC power can readily flow between them.

The adapter 412 includes within it Power Line Network Adapter (PLNA) components, illustrated as a module 432, including, but not limited to, a transformer, caps, AD and DA converters, and an interface chip to convert the data signals that are carried by the AC current passing between line 416 and brick 410 to another signaling form, such as USB, Ethernet, IEEE-1394, and the like. The PLNA module 432 is in signal communication with at least one data port 434 formed in an external surface of the adapter 412. Alternatively, the PLNA module may be in signal communication with a cable, said cable may have a connector at the far end so that it can be plugged into a port on the portable device. An example of this might be having a USB cable carrying the signal emanating from the PLNA module with a USB connector at the far end for plugging into an available USB port on the device being powered. The type of signal communication between the PLNA module 432 and the data port 434, and therefore the configuration of data port 434, can be any of numerous known networking standards, including, but not limited to, USB, Ethernet (RJ-45), IEEE-1394 (Firewire), and the like. Additionally, there can be a plurality of ports 434, of the same or different data signal types; for different network types, PLNA module 434 includes the necessary circuitry to communicate using the different protocols.

A data line 436 includes a data connector 438 sized and configured to mate with port 434 and establish a data communication pathway between the PLNA module 432 and the data line 436. Another aspect of the present invention includes that the data line 436 is a captive data line, for which port 434 and connector 438 are eliminated and the data line 436 is hardwired to the PLNA module 432.

Although the embodiment shown if FIG. 6 has been drawn with a rectangular case 422, it is also possible to make this case in any shape and form. For example, the entire network brick may be enclosed in a small case or encapsulated to appear as a bulge in a power cable or, when component sizes are reduced, all components may be housed within a plug such as 419.

While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A powerline networking adapter suitable for connection to a power brick, the power brick including a brick enclosure having a first end, an AC to DC converter mounted within the brick enclosure including first portions configured and arranged to be connected to an AC power source at the brick enclosure first end, and a DC output from the AC to DC converter configured and arranged to power a DC-powered device, the adapter comprising:
   an enclosure including an electrical power conductor having second portions configured and arranged to mate with said first portions; and
   a powerline networking adapter within the enclosure, said enclosure configured and arranged to mate with said brick enclosure.

2. An adapter in accordance with claim 1, wherein the powerline networking adapter includes at least one data connection on an exterior of the enclosure.

3. An adapter in accordance with claim 2, wherein the at least one data connection comprises an interface selected from the group consisting of Universal Serial Bus, Ethernet, IEEE-1394, and combinations thereof.

4. An adapter in accordance with claim 1, wherein said powerline networking adapter conforms to the HomePlug specifications.

5. An adapter in accordance with claim 1, wherein the enclosure electrical conductor further comprises third portions configured and arranged to mate with the enclosure second portions.

6. An adapter in accordance with claim 5, wherein the enclosure electrical conductor third portions comprise a recessed port.

7. An adapter in accordance with claim 5, further comprising an AC power cord including a connector configured and arranged to mate with the enclosure electrical conductor third portions.

8. An adapter in accordance with claim 1, wherein the enclosure electrical conductor second portions comprise a protruding connector.

9. An adapter in accordance with claim 1, wherein the enclosure includes a body and at least two extensions extending away from the body, the at least two extensions laterally spaced apart a distance sufficient to receive the brick enclosure between the at least two extensions.

10. An adapter in accordance with claim 1, wherein the enclosure includes at least one detent arranged to engage an outer surface of the brick enclosure.

11. An adapter in accordance with claim 1, wherein the brick enclosure has a second end and a first length between the brick enclosure first and second ends, the adapter enclosure further comprising:

a body and extension portions, the extension portions having a second length and an end, the first length and the second length being such that the extension portions end extend past the brick enclosure second end when the brick enclosure and the adapter enclosure are mated together.

* * * * *